US010451127B2

(12) United States Patent
Fischl

(10) Patent No.: US 10,451,127 B2
(45) Date of Patent: Oct. 22, 2019

(54) UTILITY VEHICLE DISK BRAKE

(71) Applicant: KNORR-BREMSE Systeme fuer Nutzfahrzeuge GmbH, Munich (DE)

(72) Inventor: Tobias Fischl, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 25 days.

(21) Appl. No.: 15/572,065

(22) PCT Filed: May 6, 2016

(86) PCT No.: PCT/EP2016/000747
§ 371 (c)(1),
(2) Date: Feb. 27, 2018

(87) PCT Pub. No.: WO2016/177474
PCT Pub. Date: Nov. 10, 2016

(65) Prior Publication Data
US 2018/0163797 A1    Jun. 14, 2018

(30) Foreign Application Priority Data
May 7, 2015   (DE) .................. 10 2015 107 128

(51) Int. Cl.
*F16D 55/226*  (2006.01)
*F16D 55/2265*  (2006.01)
(Continued)

(52) U.S. Cl.
CPC ....... *F16D 55/2262* (2013.01); *F16D 55/227* (2013.01); *F16D 55/22655* (2013.01); *F16D 2055/002* (2013.01); *F16D 2055/0008* (2013.01)

(58) Field of Classification Search
CPC ......... F16D 55/2262; F16D 2055/0008; F16D 55/227; F16D 55/22655; F16D 2055/002
(Continued)

(56) References Cited

U.S. PATENT DOCUMENTS 3,442,353 A   5/1969  Harrison
3,893,546 A   7/1975  Kestermeier et al.
(Continued)

FOREIGN PATENT DOCUMENTS

CN   104246273 A    12/2014
DE   25 20 493 A1   12/1975
(Continued)

OTHER PUBLICATIONS

Chinese-language Office Action issued in counterpart Chinese Application No. 201680026398.3 dated Sep. 19, 2018 with English translation (11 pages).
(Continued)

*Primary Examiner* — Pamela Rodriguez
(74) *Attorney, Agent, or Firm* — Crowell & Moring LLP

(57) ABSTRACT

A utility vehicle disk brake includes a vehicle-mounted brake carrier that partially surrounds a brake disk, and a brake caliper that is arranged on and partially covers the brake carrier. Sliding guides allow the brake caliper to slide relative to the brake carrier perpendicularly to a friction surface of the brake disk. A first one of the sliding guides is designed as a fixed bearing, and a second one of the sliding guides is designed as a floating bearing. At least the floating bearing is designed as a slotted guide having a guideway that runs in the sliding direction of the brake caliper as well as a first guiding element that is accommodated in the guideway.

7 Claims, 5 Drawing Sheets

(51) Int. Cl.
*F16D 55/227* (2006.01)
*F16D 55/00* (2006.01)

(58) Field of Classification Search
USPC .......... 188/73.43, 73.44, 73.45, 73.39, 73.46
See application file for complete search history.

(56) References Cited

U.S. PATENT DOCUMENTS

| | | | | |
|---|---|---|---|---|
| 4,331,221 | A | * | 5/1982 | Evans ............... F16D 55/22655 188/73.31 |
| 4,775,033 | A | | 10/1988 | Heibel |
| 4,852,700 | A | * | 8/1989 | Heibel ............... F16D 55/2262 188/73.43 |
| 5,080,203 | A | * | 1/1992 | Heibel ............... F16D 55/2262 188/73.31 |
| 5,279,394 | A | * | 1/1994 | Wollenweber ............ B60T 8/52 188/1.11 E |
| 2008/0029356 | A1 | * | 2/2008 | Halasy-Wimmer ........................ F16D 55/22655 188/73.45 |
| 2015/0021125 | A1 | | 1/2015 | Nessi et al. |
| 2016/0053836 | A1 | | 2/2016 | Welin |

FOREIGN PATENT DOCUMENTS

| | | |
|---|---|---|
| DE | 29 50 232 A1 | 6/1980 |
| DE | 89 07 101 U1 | 10/1990 |
| DE | 90 03 990 U1 | 8/1991 |
| DE | 102007008728 A1 * | 8/2008 |
| DE | 20 2013 101 406 U1 | 5/2013 |
| EP | 0 229 618 A2 | 7/1987 |
| GB | 2 039 646 A | 8/1980 |

OTHER PUBLICATIONS

International Search Report (PCT/ISA/210) issued in PCT Application No. PCT/EP2016/000747 dated Oct. 7, 2016 with English translation (six pages).
German-language Written Opinion (PCT/ISA/237) issued in PCT Application No. PCT/EP2016/000747 dated Oct. 7, 2016 (four pages).
German-language Office Action issued in counterpart German Application No. 10 2015 107 128.2 dated Nov. 3, 2015 (six pages).

* cited by examiner

UTILITY VEHICLE DISK BRAKE

BACKGROUND AND SUMMARY OF THE INVENTION

The present invention relates to a disc brake of a utility vehicle.

In generic disc brakes, a brake caliper surrounding a brake disc is mounted on a brake carrier fixed to the vehicle such that it is displaceable in and against a brake-application direction of the disc brake. During a braking procedure, the brake caliper here is displaced relative to the brake disc, wherein a reaction force is produced on the rear of the brake caliper. As a result of this reaction force on the rear of the brake caliper, both the brake pad on the brake-application side and the brake pad provided on the rear side of the brake disc are pressed against the brake disc, which generate a braking torque by means of friction after overcoming an air gap present between the brake disc and the brake pads. The displacement of the brake caliper takes place here by means of a brake-application device, which substantially has a piston rod of a pneumatically or electromotively or spring actuated brake cylinder (not shown) and a movable pivoted lever, whereof the force during a brake-application procedure is distributed via a bridge to two threaded rams which press the brake pad on the brake-application side against the brake disc.

The brake caliper here is displaceable relative to the brake carrier, perpendicularly to the friction surface of the brake disc, via sliding guides. To this end, two sliding guides are provided, which each comprise a guide bar which is screwed to the brake carrier and extends with play into a respective bore in the brake caliper, wherein the guide bars and the bores receiving them extend in the brake-application direction of the disc brake. Arranged in this bore in the brake caliper is a respective bearing or sliding element which ensures a low-friction displaceability of the brake caliper with respect to the brake carrier without a high loss of power.

One of the sliding guides here is formed as a fixed bearing with a low sliding play, whilst the other is formed as a floating bearing, in particular for compensating manufacturing tolerances, thermal expansion of the component and assembly tolerances.

However, the production of a disc brake having a fixed bearing and floating bearing formed in this way for mounting the brake caliper on the brake carrier is relatively expensive, in particular owing to the bores for receiving the guide bars having to be incorporated precisely in the brake caliper.

The object of the present invention is to develop an economically producible disc brake of the generic type whilst at the same time retaining the stationary and floating bearing concept.

This object is achieved by a disc brake according to embodiments of the invention.

The inventive disc brake of a utility vehicle has a brake carrier which is stationary on the vehicle side and partially surrounds a brake disc and a brake caliper which is arranged on the brake carrier and partially surrounds the latter. The brake caliper is displaceable relative to the brake carrier, perpendicularly to a friction surface of the brake disc, via sliding guides. A first sliding guide of the sliding guides is formed here as a fixed bearing and a second sliding guide of the sliding guides is formed as a floating bearing. At least the floating bearing is formed according to the invention as a sliding block guide having a guideway extending in the displacement direction of the brake caliper and a first guide element received in the guideway.

A substantial simplification of the construction of the floating bearing is achieved as a result of designing the floating bearing as a sliding block guide. The function of the fixed bearing and the floating bearing of the brake caliper bearing arrangement is split here, wherein the guidance of the brake caliper through the brake-application movement and the wear path is assumed by the fixed bearing. The floating bearing now assumes the function of vibration stabilization and holding down the brake caliper to prevent the brake caliper from swinging or pivoting open about the fixed bearing. Such a simplified floating bearing is notable in particular for the more economical production method.

Advantageous variant embodiments of the invention are described and claimed herein.

According to an advantageous variant embodiment of the invention, the first guide element is arranged on the brake carrier such that it extends parallel to the friction surface and the guideway is arranged on a part of the brake caliper.

In a second alternative variant embodiment, the first guide element is arranged on the brake caliper such that it extends parallel to the friction surface of the brake disc and the guideway is arranged on a part of the brake carrier. Both variant embodiments enable the use of a slide block guide instead of a slide bush known from the prior art for receiving a guide bar as a guide element. Also, although it is possible to form the guide element as a bar, it is not compulsory. A design of the first guide element as a pin or the like having a lateral surface serving as a sliding surface is also conceivable.

The first guide element extends particularly preferably in the direction of the longitudinal extent of the brake carrier. According to an alternative variant embodiment, the first guide element extends perpendicularly to the direction of the longitudinal extent of the brake carrier and parallel to the friction surface of the brake disc.

Both variant embodiments are notable for the simple assembly of such a guide element, for example on a lower side of the brake caliper, which faces the brake carrier, or on an outer side of a pad carrier horn of the brake carrier, which faces away from a pad shaft for receiving brake pads, preferably by screwing said guide element into a bore which is provided for this purpose and has an internal thread.

According to an advantageous variant embodiment, the guideway has sliding surfaces which are formed as mutually parallel-aligned inner surfaces of an elongated hole in which the first guide element is displaceable in the displacement direction of the brake caliper.

According to an alternative variant embodiment, the guideway has sliding surfaces which are formed as mutually parallel-aligned inner surfaces of an elongated groove which is open on one side in the sliding direction of the first guide element.

The introduction of such an elongated hole or the formation of an elongated groove in the brake carrier or in the brake caliper is possible in a simple and economical manner in particular in brake carriers or brake calipers formed as cast parts.

According to a preferred variant embodiment of the invention, a head piece reaching behind the guideway is integrally formed or mounted on an end face of the first guide element. This head piece effectively prevents the brake caliper and the fixed bearing from swinging or pivoting open.

BRIEF DESCRIPTION OF THE DRAWINGS

Preferred exemplary embodiments are explained in more detail below with reference to the accompanying drawings, which show.

DETAILED DESCRIPTION OF THE DRAWINGS

In the description below of the figures, terms such as upper, lower, left, right, front, rear etc. refer only to the exemplary representation and position, selected in the respective figures, of the brake carrier, the brake caliper, the guide elements, the guideway and the like. These terms are not to be understood as restrictive, i.e. these relationships can change as a result of different operating positions or the mirror-symmetrical configuration or the like.

Figure 1:
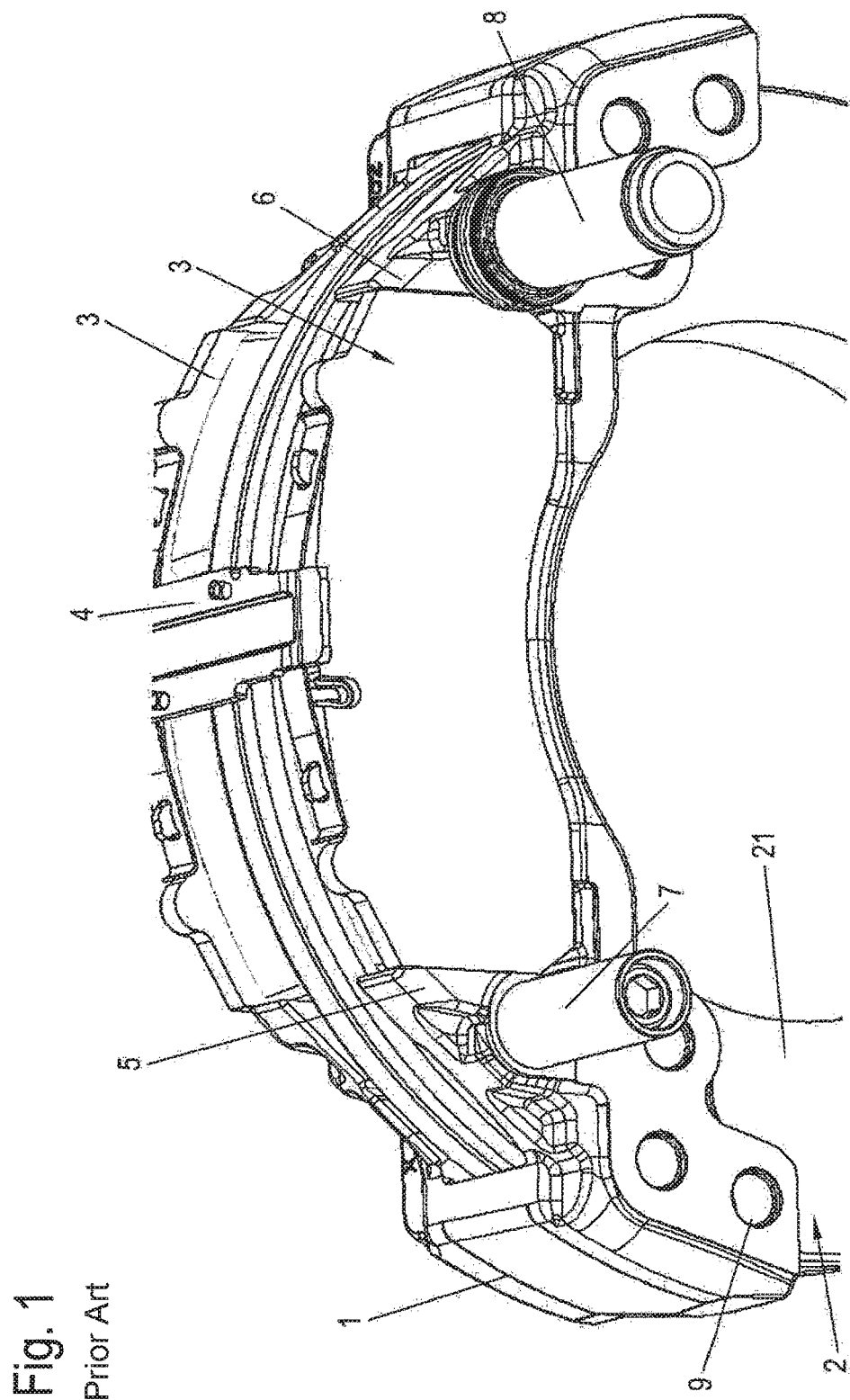
FIG. 1 is a detail of a generic disc brake of a utility vehicle according to the prior art.

In FIG. 1, a brake carrier of a generic disc brake as known from the prior art is denoted by the reference numeral 1. This brake carrier 1 is fixed in a stationary manner on the vehicle side, for which throughbores 9 are provided for connecting screws which can be tightly screwed to a vehicle axle part of a utility vehicle.

The brake carrier 1 is arranged here such that it partially surrounds a brake disc 2. On both sides of the friction surface of the brake disc 2, the brake carrier has pad shafts delimited by carrier horns 5, 6 and a bridge for the purpose of receiving a respective brake pad 3. After their integration, the brake pads 3 here are preferably secured radially with respect to the axis of rotation of the brake disc by a pad retainer bracket 4, wherein this pad retainer bracket 4 is conventionally fixed to a brake caliper (not shown here) partially surrounding the brake carrier 1.

Guide bars 7, 8 of sliding guides are furthermore fixed on a brake-application side of the brake carrier 1. One of the guide bars 7 here forms a component of a floating bearing whilst the guide bar 8 is a component of a fixed bearing with which the guidance of the brake caliper through the brake-application movement and the wear path takes place. The floating bearing here serves in particular for compensating manufacturing and assembly tolerances in the circumferential direction of the brake disc.

Figure 2:
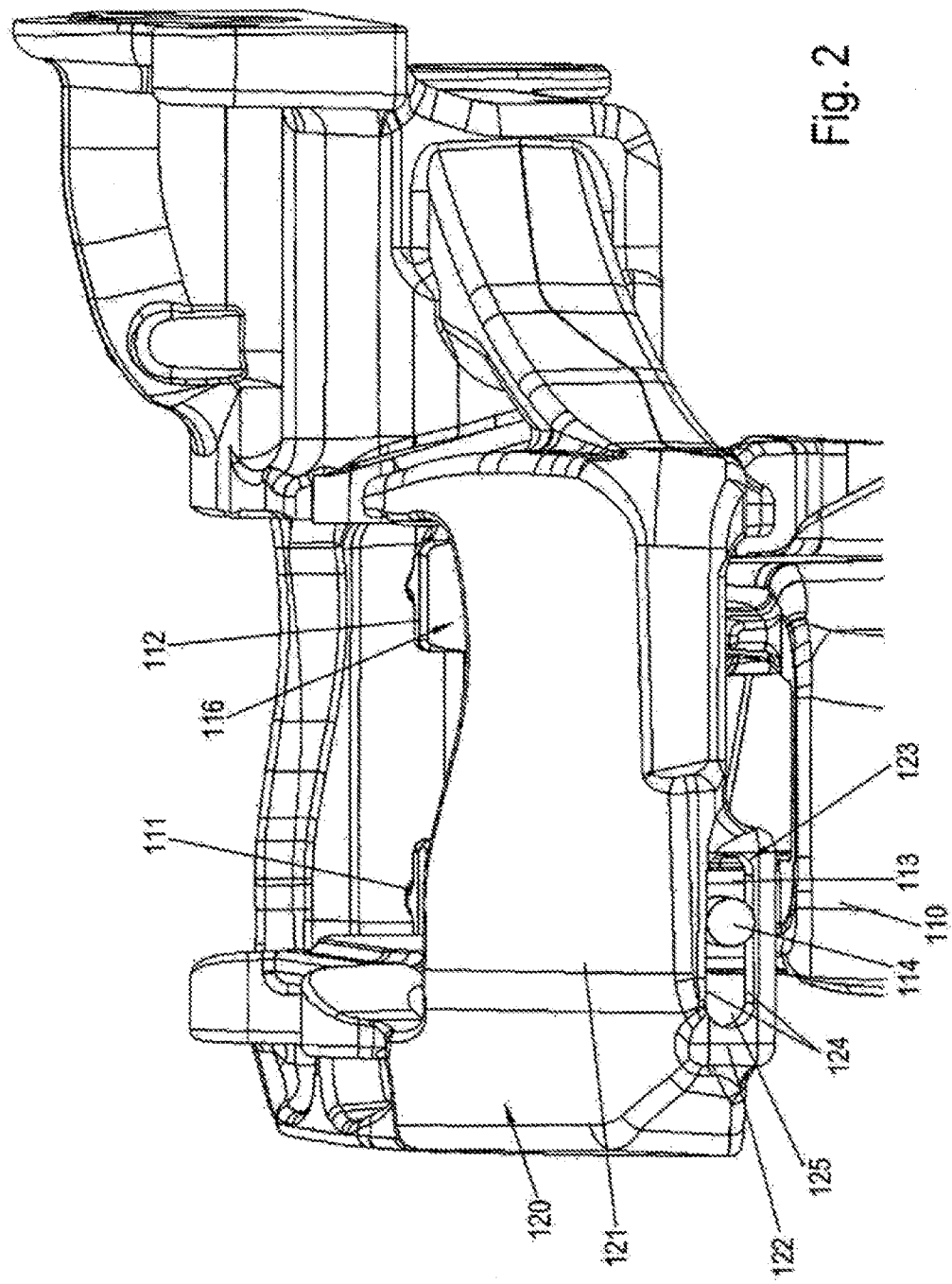
FIG. 2 is a perspective view of a brake carrier and a brake caliper of a variant embodiment of a disc brake according to the invention, which brake caliper surrounds said brake carrier.
Figure 3:
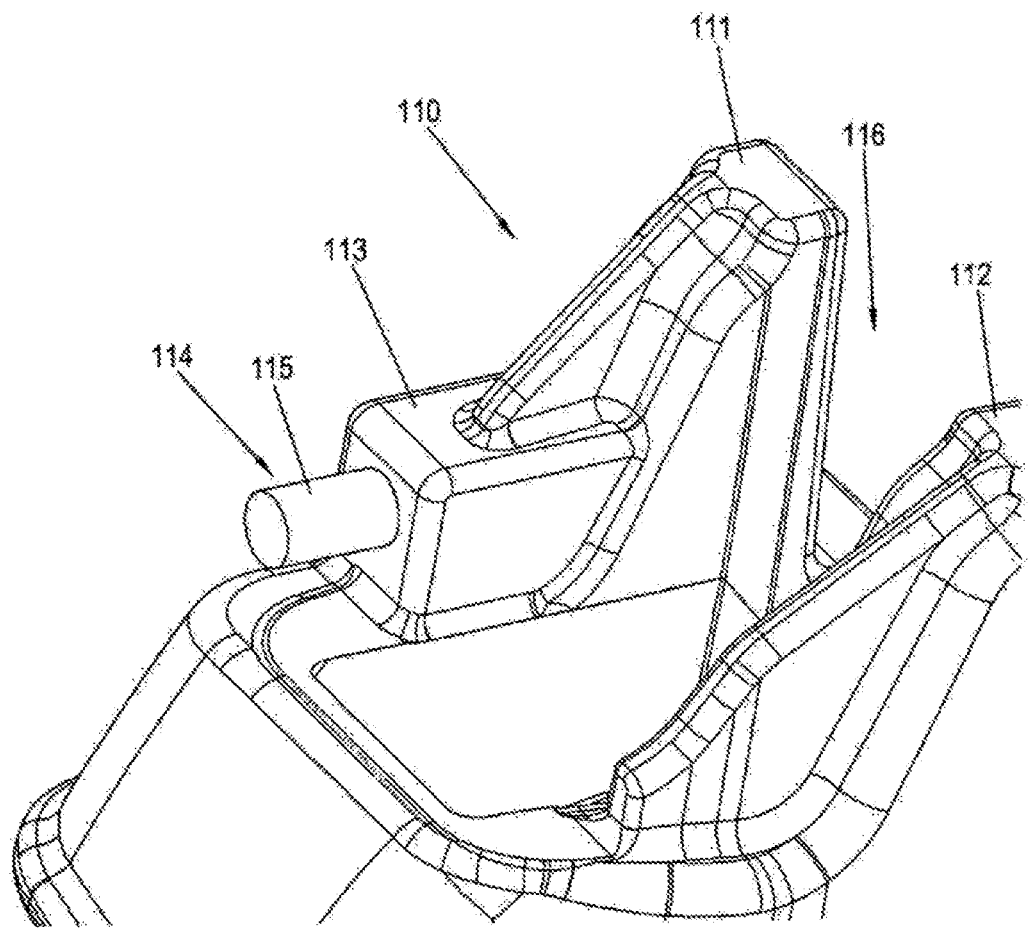
FIG. 3 is a perspective view of a part of a brake carrier of the variant embodiment shown in FIG. 2.

A first variant embodiment of a sub-region of an inventive disc brake of a utility vehicle is illustrated in a perspective view in FIGS. 2 and 3. The basic construction of the disc brake corresponds here to the construction of the generic disc brake explained with reference to FIG. 1.

A brake carrier 110 is also fixed in a stationary manner on the vehicle side here and surrounds a brake disc (not illustrated). The brake carrier 110 is connected to a brake caliper 120 partially surrounding said brake carrier. The brake caliper 120 is also displaceable relative to the brake carrier 110, perpendicularly to a friction surface 21 of the brake disc, via sliding guides here. One of the sliding guides here is formed as a fixed bearing and a second sliding guide of the sliding guides is formed as a floating bearing.

In contrast to the generic disc brake, the floating bearing is formed as a sliding block guide having a guideway 123 extending in the displacement direction of the brake caliper 120 and a first guide element 114 received in the guideway 123.

In the variant embodiment shown in FIGS. 2 and 3, the first guide element 114 is arranged on the brake carrier 110, preferably screwed thereto. In contrast to the construction known from the prior art, the first guide element 114 extends parallel to the friction surface 21 of the brake disc 2.

In the variant embodiment shown here, the first guide element 114 extends in the direction X of the longitudinal extent of the brake carrier 110. As shown in FIG. 3, the guide element here is preferably formed as a bar having a lateral surface 115 serving as a sliding surface. Other forms of the guide element 114, for example as a pin or screw, are also conceivable.

The guide element 114 extends here from a part 113 of the brake carrier 110 which faces an inner surface of the brake caliper 120. This part 113 of the brake carrier 110 here is integrally formed on an outer side—facing away from the pad shaft 116—of a reaction-side brake carrier horn 111 having an assembly surface which is formed perpendicularly to the longitudinal extent of the brake carrier 110 and from which the first guide element 114 extends.

The guideway 123 shown in FIG. 2 has sliding surfaces 124 which are formed as mutually parallel-aligned inner surfaces of an elongated hole 125. The elongated hole 125 here is incorporated in a part 122 of the brake caliper 120, wherein the longitudinal extent of the elongated hole and the sliding surfaces 124 is or are aligned in the displacement direction of the brake caliper 120, i.e. in the brake-application direction of the brake caliper 120.

In principle, it is also conceivable to arrange the guideway 123, and accordingly the part 113 of the brake carrier 110 having the first guide element 114 arranged thereon, on the brake-application side of the brake carrier 110 or the brake caliper 120.

An alternative variant embodiment of an inventive disc brake of a utility vehicle is explained below with reference to FIGS. 4 to 6.

Figure 4:
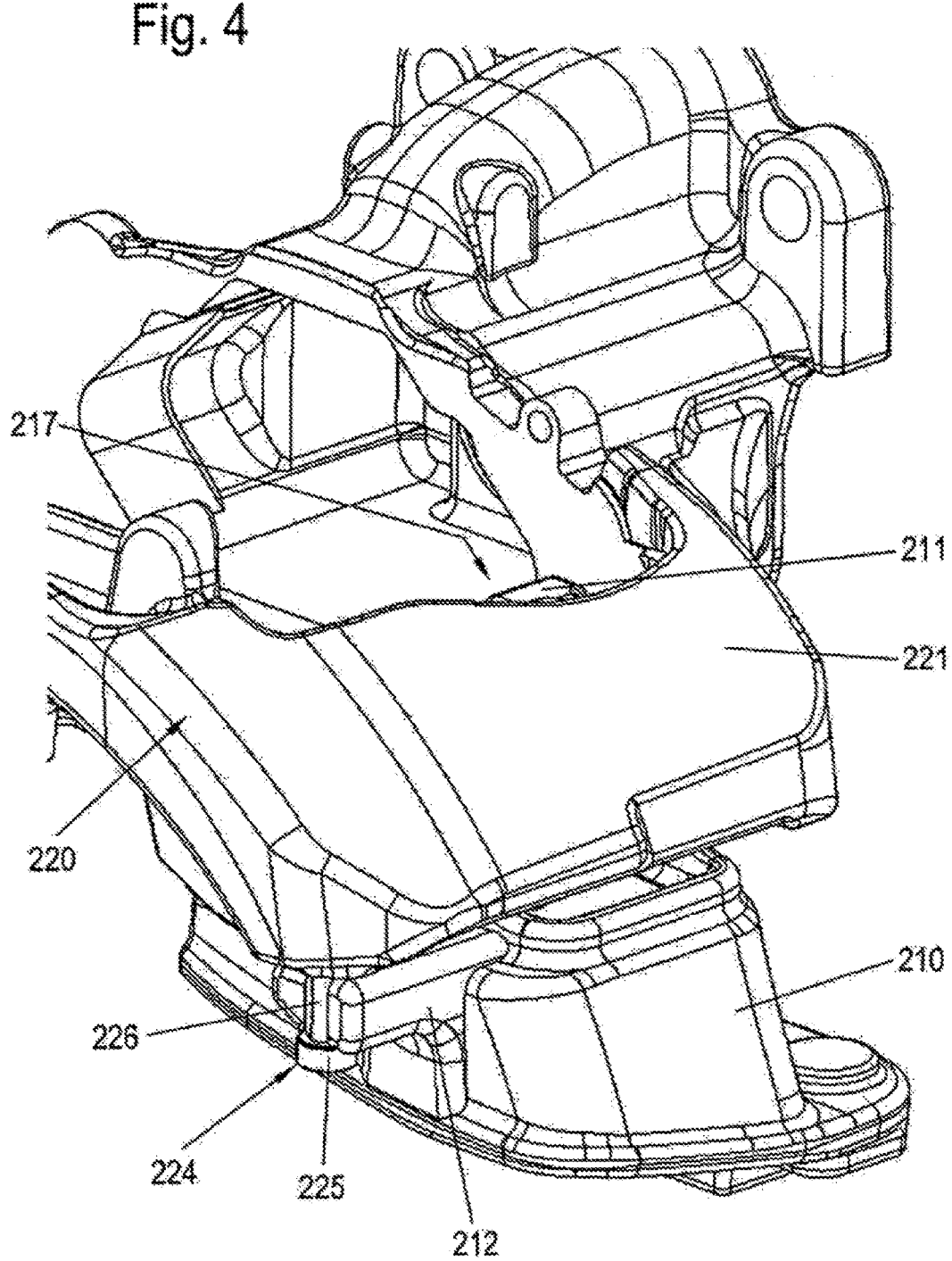
FIG. 4 is a perspective view of a brake carrier and a brake caliper according to an alternative variant embodiment of a disc brake according to the invention, which brake caliper surrounds said brake carrier.

As shown in FIG. 4, the basic construction of the disc brake here also corresponds to the generic disc brake as described with reference to FIG. 1.

In contrast to the variant embodiment according to FIGS. 2 and 3, in this variant embodiment a guideway 213 is arranged on the brake carrier 210 on a part 212.

The first guide element 224 of this variant embodiment is arranged on the brake caliper 220. The first guide element 224 here extends parallel to the friction surface 21 of the brake disc (not illustrated here). As can be seen in FIGS. 4 to 6, the first guide element 224 extends particularly preferably perpendicularly to the direction of the longitudinal extent of the brake carrier and parallel to the friction surface of the brake disc or perpendicularly to the axis of rotation of the brake disc from a lower side 222 of the brake caliper 220 near to a reaction-side outer wall 223 of the brake caliper 220.

The first guide element 224 is preferably screwed into a bore (not shown) on the lower side 222 of the brake caliper 220, which bore is provided with an internal thread. However, other options for mounting the first guide element 224 on the brake caliper 220, for example by welding or adhesion, are also conceivable. A single-piece construction of the first guide element 224 with the brake caliper 220 is also conceivable.

In this variant embodiment, the first guide element 224 has a head piece 225 which reaches behind the guideway 213 and is mounted or integrally formed on the end side of a neck piece which is preferably formed as a bar with a lateral surface 226.

It is important for the shape of the head piece 225 here that the width of the head piece 225 is greater than the spacing between the mutually parallel-aligned sliding faces 214 of the guideway 213 arranged on the brake carrier 210 so as to prevent the brake caliper 220 from swinging about the fixed bearing (not shown) in the functional position.

Figure 5:
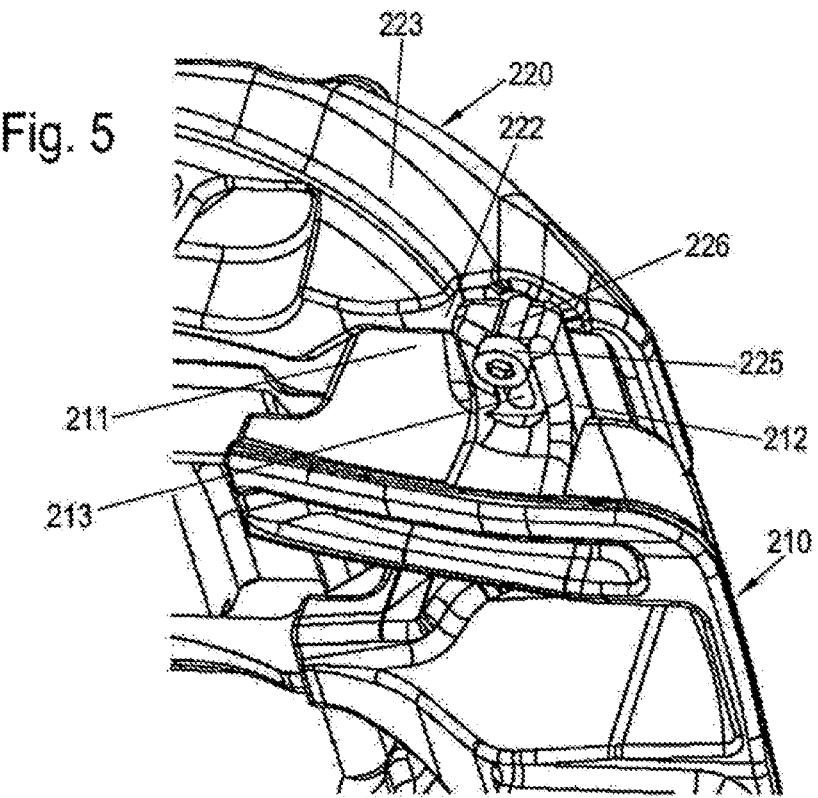
FIG. 5 is a perspective view of a detail of the components, shown in FIG. 4, of the disc brake in a non-braking position.
Figure 6:
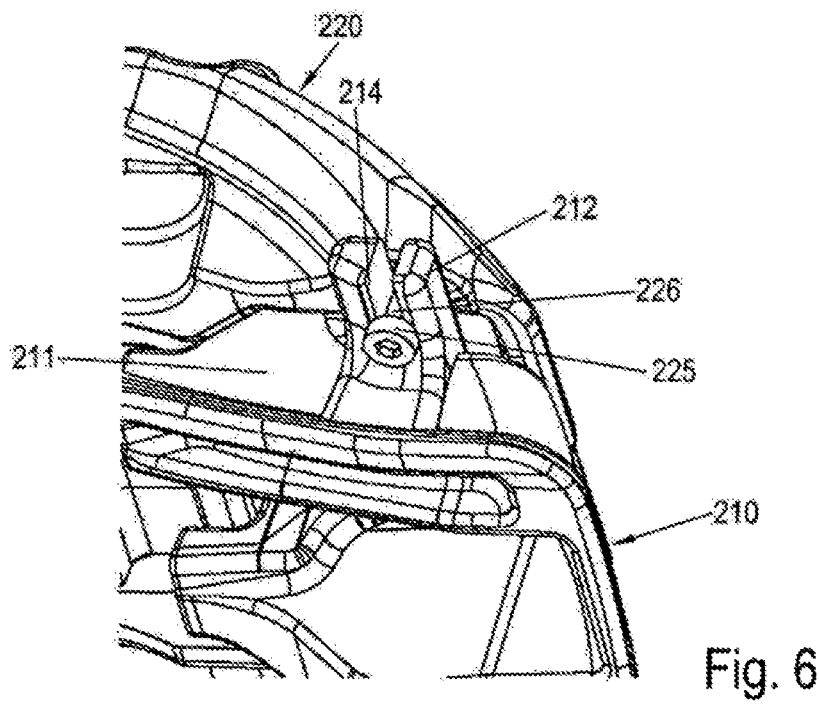
FIG. 6 is a perspective view of the detail illustrated in FIG. 5 in a braking position of the brake caliper.

As shown in FIGS. 5 and 6, the guideway 213 has sliding surfaces 214 which are formed as mutually parallel-aligned inner surfaces of an elongated groove which is open on one side in the sliding direction of the first guide element 224, that is to say in or against the brake-application direction of the disc brake.

The part 212 of the brake carrier 210 in which the elongated groove is incorporated is preferably arranged here on a reaction-side brake carrier horn 211 on a side of the brake carrier horn 211 of the brake carrier 210 which faces away from the brake pad shaft 217.

In principle, it is also conceivable to arrange the elongated groove, and accordingly the part 212 of the brake carrier 210 with the first guide element 224 arranged thereon, on the brake-activation side of the brake carrier.

The part 212 on which the guideway 213 is formed is preferably integrally formed on the brake carrier 210 in a single piece. It is also conceivable to form the part 212 as a separate component and to mount it on the brake carrier 210, for example to screw it thereto.

FIG. 5 shows a relative position of the brake caliper 220 and the brake carrier 210 in a non-braking position in which the first guide element 224 is positioned at a first end of the guideway 213, whilst FIG. 6 shows the relative position of the brake caliper 220 and the brake carrier 210 in a braking position in which the brake caliper 220 has been displaced in the direction of the brake disc to lie against the reaction-side brake pads and in which the first guide element 224 is positioned near to an opposite second end of the guideway 213.

The longitudinal extent of the guideway 123, 213 of both of the above-described variant embodiments is dimensioned such that an adequate displacement of the brake caliper 120, 220 is still enabled if the brake pads are worn.

LIST OF REFERENCE SIGNS

1 Brake carrier
2 Brake disc
21 Friction surface
3 Brake pad
4 Pad retainer bracket
5 Carrier horn
6 Carrier horn
7 Guide bar
8 Guide bar
9 Throughbore
110 Brake carrier
111 Brake carrier horn
112 Brake carrier horn
113 Part
114 Guide element
115 Lateral surface
116 Pad shaft
120 Brake caliper
121 Rear of the caliper
122 Part
123 Guideway (Slideway)
124 Sliding surfaces
125 Elongated hole
210 Brake carrier
211 Brake carrier horn
212 Part
213 Guideway (Slideway)
214 Sliding surface
217 Brake pad shaft
220 Brake caliper
221 Rear of the caliper
222 Lower side
223 Outer wall
224 Guide element
225 Head piece
226 Lateral surface
X Direction

What is claimed is:

1. A disc brake of a utility vehicle, comprising:
a brake carrier which is stationary on a vehicle side and partially surrounds a brake disc; and
a brake caliper which is arranged on the brake carrier and partially surrounds the latter, wherein
the brake caliper is displaceable relative to the brake carrier, perpendicularly to a friction surface of the brake disc, via sliding guides,
a first sliding guide of the sliding guides is formed as a fixed bearing and a second sliding guide of the sliding guides is formed as a floating bearing,
at least the floating bearing is formed as a sliding block guide having a guideway extending in the displacement direction of the brake caliper and a first guide element received in the guideway, and
the first guide element is arranged on the brake caliper so as to extend parallel to the friction surface of the brake disc, and the guideway is arranged on a part of the brake carrier.

2. The disc brake as claimed in claim 1, wherein
the first guide element extends perpendicularly to the direction of the longitudinal extent of the brake carrier.

3. The disc brake as claimed in claim 1, wherein
the guideway has sliding surfaces which are formed as mutually parallel-aligned inner surfaces of an elongated hole.

4. The disc brake as claimed in claim 1, wherein
the guideway has sliding surfaces which are formed as mutually parallel-aligned inner surfaces of an elongated groove which is open on one side in the sliding direction of the first guide element.

5. The disc brake as claimed in claim 1, wherein
the first guide element is formed as a bar or pin having a lateral surface serving as a sliding surface.

6. The disc brake as claimed in claim 5, wherein
a head piece reaching behind the guideway is integrally formed or mounted on an end face of the first guide element.

7. The disc brake as claimed in claim 1, wherein
the first guide element extends from a lower side of the brake caliper, which faces the brake carrier.

* * * * *